(12) United States Patent
Chen et al.

(10) Patent No.: US 8,948,500 B2
(45) Date of Patent: Feb. 3, 2015

(54) METHOD OF AUTOMATICALLY TRAINING A CLASSIFIER HIERARCHY BY DYNAMIC GROUPING THE TRAINING SAMPLES

(75) Inventors: Lihui Chen, Thornhill (CA); Yang Yang, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 399 days.

(21) Appl. No.: 13/484,319

(22) Filed: May 31, 2012

(65) Prior Publication Data

US 2013/0322740 A1    Dec. 5, 2013

(51) Int. Cl.
*G06K 9/62*       (2006.01)
(52) U.S. Cl.
USPC ........................... 382/159; 382/155; 382/224
(58) Field of Classification Search
CPC . G06K 9/6256; G06K 9/6267; G06K 9/6262; G06K 9/66; G06K 9/6257; G06K 9/6282; G06K 9/6219; G06K 9/6292; G06T 2207/20081; G06T 2207/20084; G06N 3/02; G06N 99/005
USPC ......................................... 382/155, 159, 161
See application file for complete search history.

(56) References Cited

U.S. PATENT DOCUMENTS

| | | | |
|---|---|---|---|
| 7,233,931 B2 * | 6/2007 | Lee et al. ........................ | 706/12 |
| 2004/0202368 A1 * | 10/2004 | Lee et al. ...................... | 382/173 |
| 2005/0105794 A1 * | 5/2005 | Fung .............................. | 382/159 |
| 2012/0106857 A1 * | 5/2012 | Schneiderman .............. | 382/224 |
| 2014/0037172 A1 * | 2/2014 | Madabhushi et al. ........ | 382/131 |

OTHER PUBLICATIONS

Techniques for Image Classification, Object Detection and Object Segmentation, Ville Viitaniemi and Jorma Laaksonen, TKK Reports in Information and Computer Science, Espoo Jan. 2008 (pp. 1-12).
Robust Face Alignment Based on Hierarchical Classifier Network, Li Zhang, Haizhou Al, and Shibong Lao, Department of Computer Science, Tsinghua University, Beijing 100084, China, Sensing and Control Technology Lab, Omron Corporation, Kyoto 619-0283, Japan, Jan. 2006, (pp. 1-11).
A Statistical Method for 3D Object Detection Applied to Faces and Cars, Henry Schneiderman and Takeo Kanade, Robotics Institute, Carnegie Mellon University, Pittsburgh, PA 15213, Jan. 2000.

* cited by examiner

*Primary Examiner* — Edward Park

(57) ABSTRACT

The present invention uses dynamic grouping to divide up training samples to train different classification nodes. At the beginning of the training, all samples are in the same group. A clustering process is applied in the feature space of the selected feature vectors with cluster indexes accumulated. The average of all the accumulated cluster indexes is used as the threshold for splitting the samples into two groups. When the splitting criterion is met, samples are split into two groups based on their similarity in the feature space.

17 Claims, 4 Drawing Sheets

METHOD OF AUTOMATICALLY TRAINING A CLASSIFIER HIERARCHY BY DYNAMIC GROUPING THE TRAINING SAMPLES

FIELD OF INVENTION

The present invention relates to object detection or object recognition and more specifically to training an object detector.

BACKGROUND

Object detection is an important problem in a variety of engineering and scientific disciplines such as computer vision, artificial intelligence, and biometrics. For example, in the many industrial settings today, robots are used for parts assembly and manufacturing. These robots are equipped with one or more cameras, e.g. CCD and CMOS, which give them vision. Often, objects (i.e. parts) are contained in a bin. The robot must recognize the object/part in the bin so it can pick it up to assemble the product. However, the object can be in any number of poses (position, orientation, rotation), under various lighting conditions, etc. So, the robot must be trained to recognize the part regardless of its pose and environment. As is known in the art, robots include software that attempts to identify the object from the camera image. Statistical learning and classification has been successfully used for many of such object detection applications.

In a real-world environment, the appearance of the object changes dramatically due to the change in view perspective, illumination, or deformation. As such, a single classifier cannot effectively detect objects whose appearance is subject to many changes. Classifier networks are general solutions based on the divide-and-conquer concept. The classifier networks must be trained to properly classify (detect, recognize) the particular object(s) of interest, such as an assembly line part. Generally, the process starts with an untrained network. A training pattern (e.g. images of the object in various poses and lighting conditions and possibly false target images) is presented to the network. The image signals are passed through the network to produce an output (classification result—yes/no object detection). The output results are evaluated and compared to optimal classification results and any differences are errors. This error can be a scalar function of weights that are assigned to features of the object image, for example. Some features are better than others for recognizing the object and may be assigned a greater weight. The weights are iteratively adjusted to reduce the error and thus give greater confidence in the classification network. It is desirable to automatically train a classification network with minimum error, time, and effort.

SUMMARY OF INVENTION

An objective of the present invention is to achieve automatic training of a classifier hierarchy. The present invention uses dynamic grouping to divide up training samples to train different classification nodes. At the beginning of the training, all samples are in the same group. A clustering process is applied in the feature space of the selected feature vectors with cluster indexes accumulated. The average of all the accumulated cluster indexes is used as the threshold for splitting the samples into two groups. When the splitting criterion is met, samples are split into two groups based on their similarity in the feature space.

Each node is then trained using the group of training samples assigned to it as a result of the splitting. Training samples of a node might come from two sources. Training samples from different paths have different weights. The reason is that samples from the "no" path from a previous node might contain more outliers, as well as incorrectly split samples, than the samples from the "yes" path. The foregoing process is applied iteratively until some stopping criterion is met.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
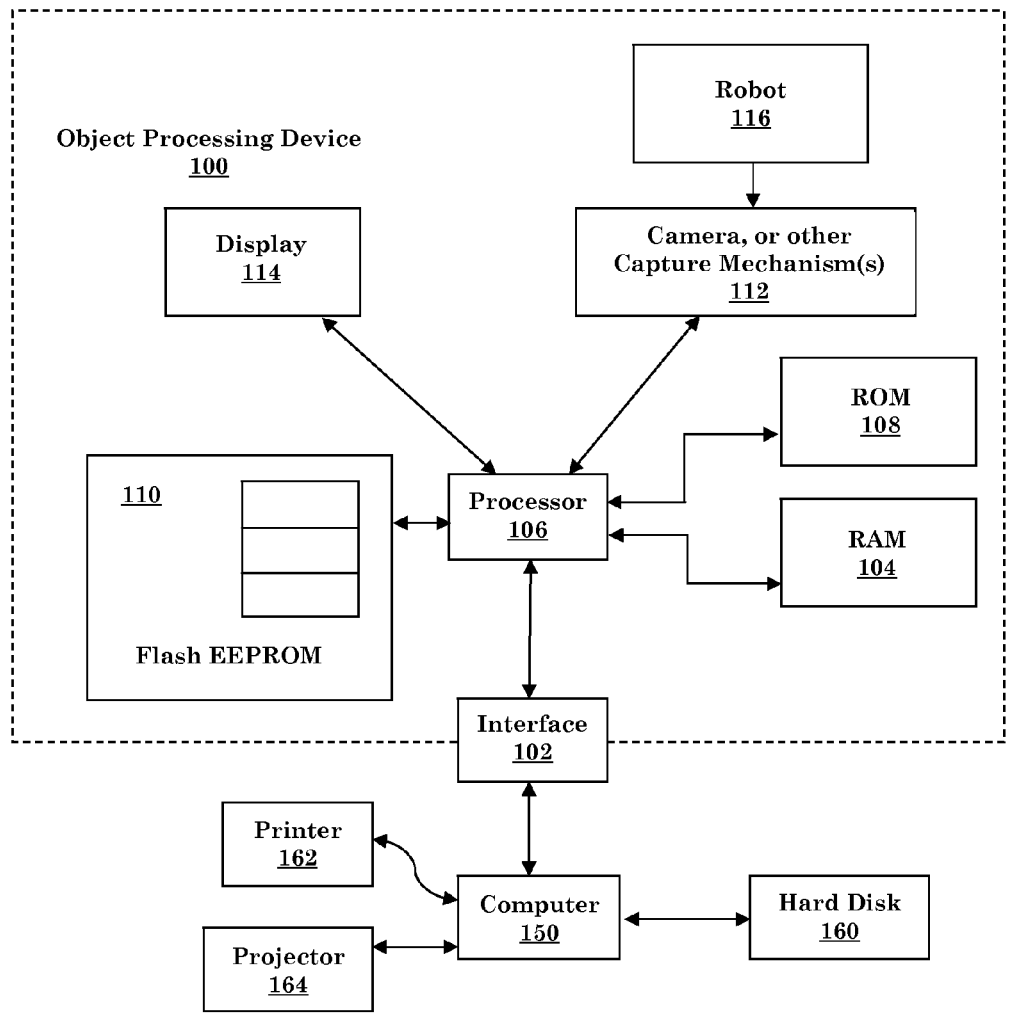
FIG. 1 is a general block diagram of an object processing device and system for utilizing the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for training a classifier. Training samples are examined within the feature space, and grouped together to train classifier nodes. Errors that might occur during the grouping process are addressed by moving the rejected samples to train a sibling node. The training samples are images, particularly digital images of one or more objects.

A schematic representation of an example object processing device 100 is shown in FIG. 1. The object processing device 100 exchanges data with a host computer 150 by way of an intervening interface 102. Application programs and an object processing device driver may also be stored for access on the host computer 150. When an image retrieve command is received from the application program, for example, the object processing device driver controls conversion of the command data to a format suitable for the object processing device 100 and sends the converted command data to the object processing device 100. The driver also receives and interprets various signals and data from the object processing device 100, and provides necessary information to the user by way of the host computer 150.

When data is sent by the host computer 150, the interface 102 receives the data and stores it in a receive buffer forming part of a RAM 104. The RAM 104 can be divided into a number of sections, for example through addressing, and allocated as different buffers, such as a receive buffer or a send buffer. Data, such as digital image data, can also be obtained by the object processing device 100 from the capture mechanism(s) 112, the flash EEPROM 110, or the ROM 108. The capture mechanism(s) 112 can be a camera, for example, and generates a digital image by photographing one or more objects, such as a part to be used in manufacturing and/or assembly of a device such as a printer. A camera 112 can be controlled by robot 116, for example, or a human, or can be automatically controlled by computer 150, for example. The digital image of the object(s) can then be stored in the receive buffer or the send buffer of the RAM 104.

A processor 106 uses computer-executable instructions stored on a ROM 108 or on a flash EEPROM 110, for example, to perform a certain function or group of functions, such as the method 400 (FIG. 4) for example. Method 400 will be discussed in greater detail later herein. Where the data in the receive buffer of the RAM 104 is a digital image, for example, the processor 106 can implement the methodological acts of the method 400 on the digital image to extract features in the digital image and further analyze the image based on the extracted features. Further processing in an imaging pipeline may then be performed on the digital image before the image is displayed on a display 114, such as an LCD display for example, or transferred to the host computer 150, for printing on printer 162, projected with projector 164, or stored on hard disk 160, for example.

The example method 400 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

In an embodiment, the method steps of the present invention described hereinafter are preferably performed by one or more processors in the object processing device 100 and/or computer 150 executing computer-executable instructions, programs, software, firmware, that are stored or loadable in memory in object processing device 100 and/or computer 150 and/or in accessible external memory. Computer 150 processors may include, for example, a central processing unit (CPU) and one or more graphical processing units (GPUs). The internal memory may include, for example, RAM and ROM. An I/O interface enables communication with a keyboard, mouse, and external memory such as hard disk 160, for example.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination.

Figure 2:
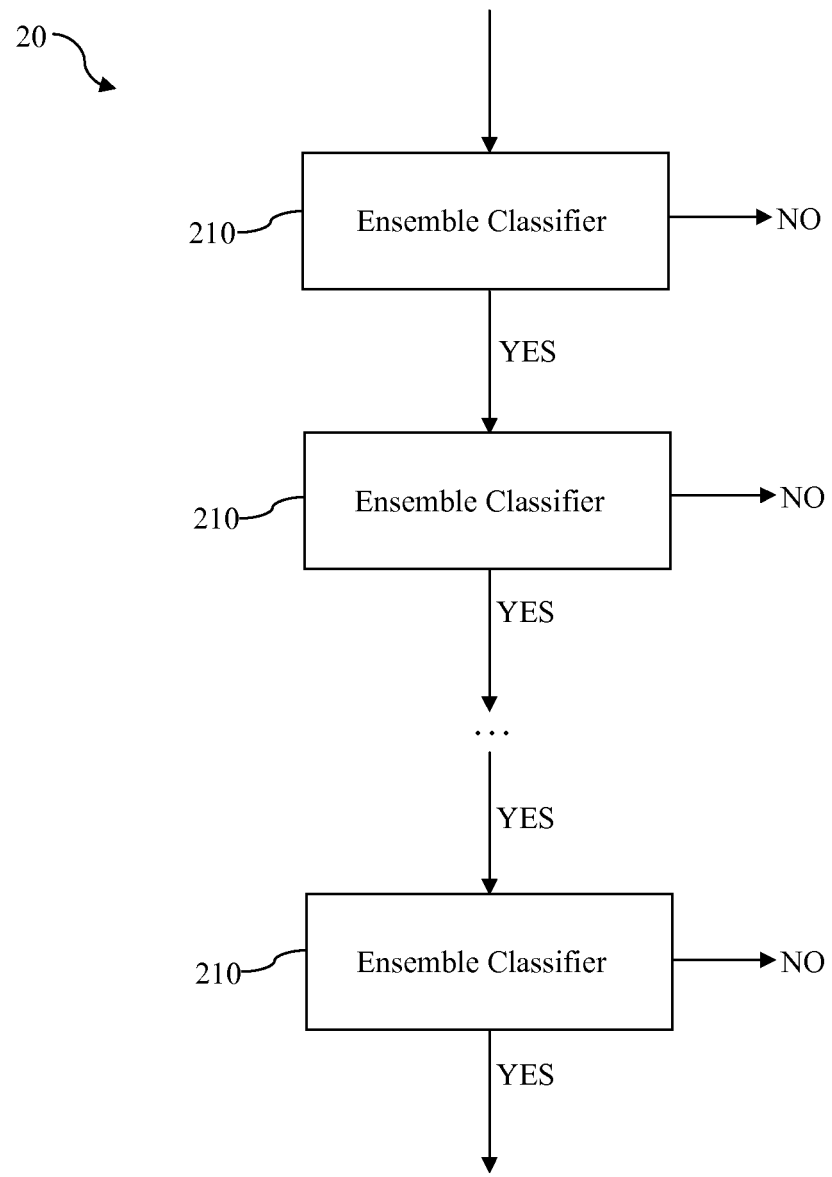
FIG. 2 illustrates a structure of a classification node.

A classifier network is comprised of a number of different classification nodes. In the present invention, preferably, a classification node 20 includes a cascade of ensemble classifiers 210 as shown in FIG. 2. Cascading uses information collected from the output from a given classifier as additional information for the next classifier in the cascade. Each ensemble classifier could include one or more weak classifiers. The rationale for using an ensemble classifier is as follows. Suppose there are a number of classifiers available, each trained on a labeled data set. Through experimentation, it is known how well they each performed on the training, testing and potentially the validation data, but this is only an estimate of how well they will generalize to the universe of all possible inputs (i.e. images of real-life objects that they are supposed to classify), not a guarantee. If all of the classifiers performed similarly on the testing and validation data, there is no way of knowing which is best. If a single such classifier is chosen randomly, there is a risk of selecting the worst one. Combining the results of all of the classifiers will most likely perform at least as well as the average classifier. Although the ensemble may or may not perform better or even as well as the best individual classifier, one cannot be sure ahead of time which one is in fact the best if they all performed similarly on the test and validation data when used individually.

Figure 3:
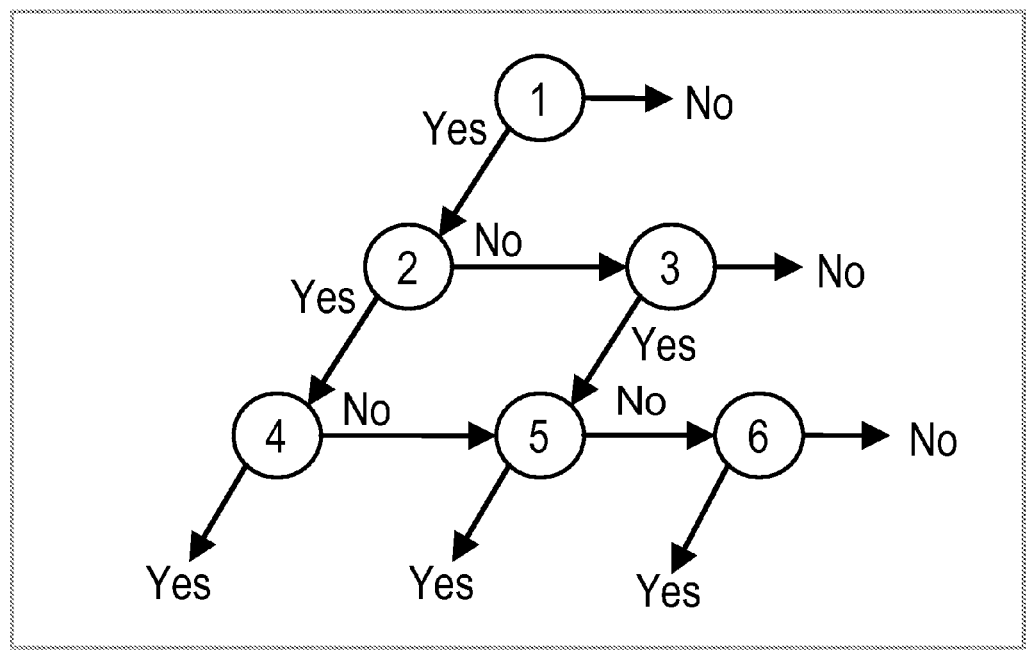
FIG. 3 illustrates a classifier hierarchy.

A classifier network can be organized in various topologies such as chain, star, hierarchy or ring. In the present invention, a classifier hierarchy as shown in FIG. 3 is the preferred embodiment as it represents a coarse-to-fine strategy. A hierarchical classifier maps input data into defined output categories. The classification occurs first on a low-level with highly-specific pieces of input data. The classifications of the individual pieces of data are then combined systematically and classified on a higher level iteratively until one output is produced. This final output is the overall classification of the data. Such strategy not only accelerates the process of the whole classifier, but also results in a compact network for the nodes doing the coarser classification job, and tends to exploit the commonality among different appearances.

Figure 4:
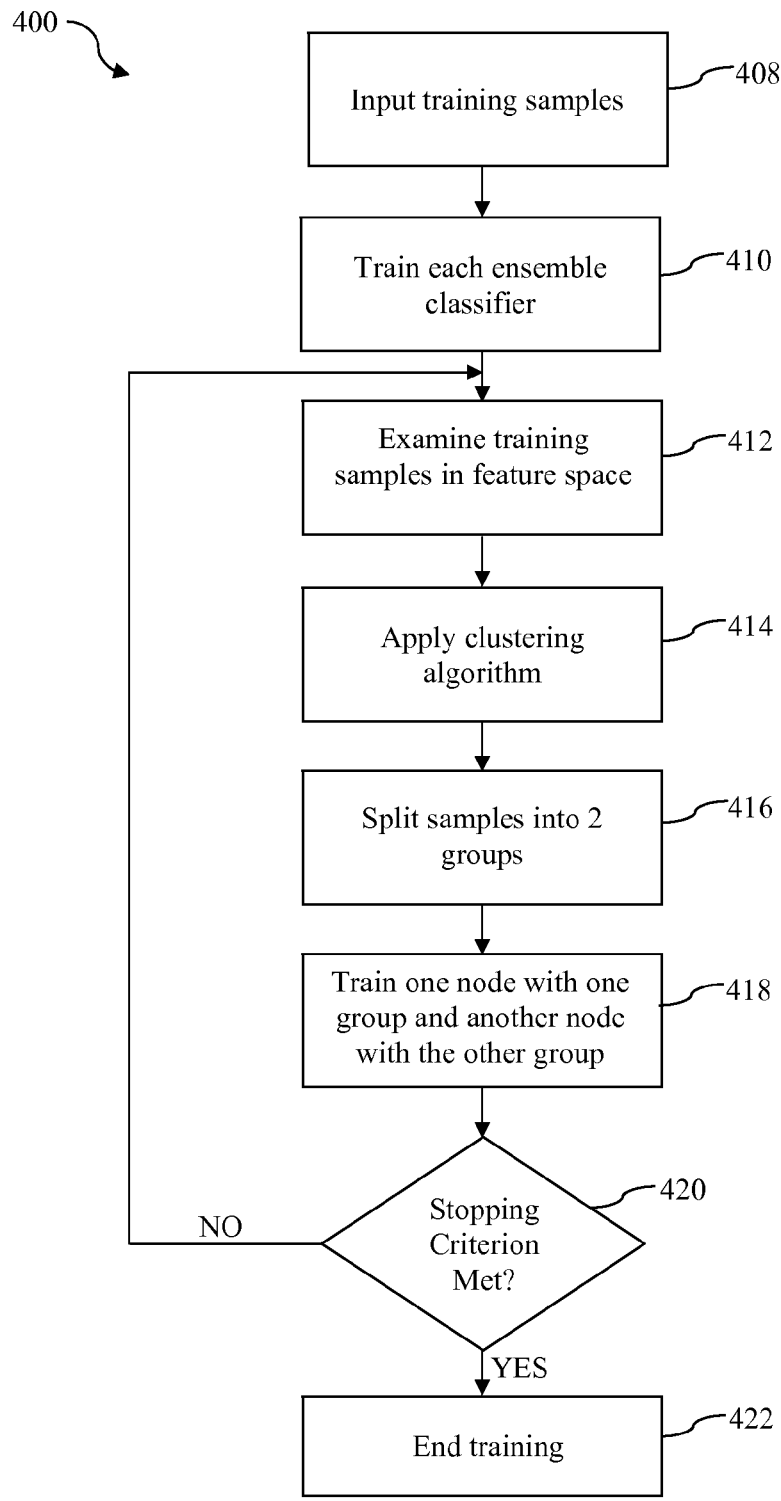
FIG. 4 is a flowchart of the general method of the present invention.

FIG. 4 illustrates the general steps of the method 400 of the present invention for iteratively training an object classifier hierarchy from a set of sample images. Referring to FIG. 4, the first step in method 400 is inputting training images (step 408). The input images can be generated by robot 116 operating a camera (capture mechanism) 112. If the input image contains one object, then it should preferably occupy at least 10% of the image area. If there is more than one object in the scene, the object of interest should preferably be at least two times larger than any other object in the image (scene). The input image can also be a CAD model of the object stored, for example, in RAM 104 or hard disk 160. In a preferred embodiment, a plurality of images of the object are input and analyzed as described below. Each of the plurality of images preferably contains a view of the object that is different than a view shown in each of the other images. This plurality of images can be generated using the CAD model and/or robot 116 operating a camera.

In some training methodologies, training samples (images) are labeled with many attributes (i.e. poses, illumination groups, blurred) in order to drive the classifier hierarchy training. On one hand, the more attributes to label, the more manual labeling work, which also means more errors. On the other hand, it is difficult to ensure the defined categories are optimal in the feature space. For example, camera or other capture mechanism 112 could take images of the object with an out-of-plane rotation for every 30° to be in a different group and labeled with different pose attributes. Feature vectors representing these images are stored in a database for later comparison with a query image. The output of a successful comparison would be the name of the object detected accompanied by its attribute (e.g. pose). The granularity of such categorization might be too fine for a flat object, and too coarse for a bulging object. In the present invention, the only attribute assigned for all training samples is the object/non-object attribute. Thus each training sample (image) is labeled as "object" or "non-object". This dramatically simplifies the labeling process.

Referring again to FIG. 4, the next step in method 400 is training each ensemble classifier 210 in a node 20 of the classifier hierarchy with the training samples (step 410). The ensemble classifiers are trained using conventional training protocols such as stochastic, batch, or on-line.

The next step in method 400 is examining the training images in feature space (step 412). The general goal of the feature extractor is to characterize an object to be recognized by measurements whose values are very similar for objects in the same category. For example, the image samples used for training can be single-channel images that contain one or more objects on a plain background. Objects in the input image may be single-color with a minimum of contrast between the background and the objects. Some of the objects may be darker than the background and some may be brighter than it. Objects may have similar or different colors. The feature extractor then can identify areas of the image whose pixel values that fall within some color range or above/below some color threshold, i.e. pixel blocks corresponding to the color object as contrasted to the plain background. As will be appreciated, for example, in an assembly environment parts are conveyed on a plain conveyer or in a plain box so that the color objects can be more easily detected by the assembly robot. The task of the classifier then is to use the feature vector output from the feature extractor to assign the image or segment of the image to a category, such as object or background. Feature extraction is performed by one or more processors in the object processing device 100 and/or computer 150. The present invention is not concerned with nor limited by a particular feature extractor, which will of course be entirely dependent on the types of objects being classified and the environment in which the objects are be detected.

Next, a clustering algorithm is applied to the training samples in the feature space of selected feature vectors (step 414). The present invention is not concerned with nor limited by any particular clustering algorithm or function. Any suitable criterion can be used such as sum-of-the-squared-error, related minimum variance or scatter criteria. The resulting cluster index of each sample gets accumulated using the function:

$$idx = idx + (\eta - \sigma \cdot k)$$

where idx denotes the cluster index label, k denotes the hierarchy level, $\eta$ is the maximum penalty, and $\sigma < 0$ is the penalty ratio on increasing level.

Next, to achieve the automatic training, a splitting criterion is used to split the samples into two groups (step 416). A splitting criterion used in the present invention is:

$$\frac{f}{T_{FA}} > \delta$$

where f denotes the false alarm rate of the current ensemble classifier, $T_{FA}$ denotes the target false alarm rate, and $\delta \geq 1$ is a threshold controlling the tolerance of non-perfect convergence. The higher the $\delta$, the higher tolerance on convergence before splitting.

An average of all the accumulated cluster indexes is used as a threshold $\beta$ for splitting the samples into two groups.

Thus, the present invention uses dynamic grouping to divide up the training samples to train different classification nodes. At the beginning of the training, all samples are in the same group. A clustering process is applied in the feature space of the selected feature vectors with cluster indexes accumulated. The average of all the accumulated cluster indexes is used as the threshold for splitting the samples into two groups. When the splitting criterion is met, samples are split into two groups based on their similarity in the feature space (step 418). For example, after training node 1, samples are split into two groups to train node 2 and node 3 (step 416).

Each node is then trained using the group of training samples assigned to it (step 418) as a result of the splitting. Each node is trained using conventional training protocols such as stochastic, batch, or on-line. Training samples of a node might come from two sources. For example, node 5 in FIG. 3 has training samples from the "yes" path of node 3 and the "no" path of node 4. In the training of node 5, these two groups of training samples are treated with different weights.

Training samples from different paths have different weights. The reason is that samples from the "no" path from a previous node might contain more outliers, as well as incorrectly split samples, than the samples from the "yes" path. In a preferred embodiment, the samples from "yes" and "no" paths are normalized to 0.45 and 0.05, respectively. The issue that errors might incur during the grouping process is addressed by moving the rejected samples to train a sibling node.

The foregoing process is applied iteratively until some stopping criterion is met (step 420). For example, if a minimum of the error (error threshold) has been reached on a validation set of training samples (step 420, "Yes"), the training ends (step 422). If the classification network results in too high an error on the validation set (step 420, "No"), the process loops back to step 412 to repeat examining, clustering, and splitting the samples. Other stopping criterion may include an accuracy target other than a minimum of error, or a maximum number of iterations predefined by a user.

While the invention has been described in conjunction with several specific embodiments, it is evident to those skilled in the art that many further alternatives, modifications and variations will be apparent in light of the foregoing description. For example, additional parameters such as the detection rate and number of weak classifiers can be used in the splitting criterion. Thus, the invention described herein is intended to embrace all such alternatives, modifications, applications and variations as may fall within the spirit and scope of the appended claims.

What is claimed is:

1. A method for training an object classifier hierarchy from a set of sample images, comprising:
   inputting a set of object image samples; and
   using a processor to:
   iteratively train an object classifier hierarchy as follows:
   (a) examine the object image samples in a feature space to extract feature vectors;
   (b) apply a clustering algorithm to the object image samples in the feature space of selected feature vectors;
   (c) split the object image samples into two groups using a splitting criterion based on the result of the application of the clustering algorithm;
   (d) assign one of the two groups of object image samples to train one node of the object classifier hierarchy and assign another of the two groups of object image samples to train another node of the object classifier hierarchy; and
   repeat steps (a)-(d) until a stopping threshold is met;
   wherein the splitting criterion is:

$$\frac{f}{T_{FA}} > \delta$$

where f denotes a false alarm rate of a current ensemble classifier, $T_{FA}$ denotes a target false alarm rate, and $\delta \geq 1$ is a threshold controlling a tolerance of non-perfect convergence.

2. A method for training an object classifier hierarchy as in claim 1 wherein the processor accumulates a resulting cluster index of each sample resulting from application of the clustering algorithm using the function:

$$idx = idx + (\eta - \sigma \cdot k)$$

where idx denotes the cluster index label, k denotes the hierarchy level, $\eta$ is the maximum penalty, and $\sigma < 0$ is the penalty ratio on increasing level.

3. A method for training an object classifier hierarchy as in claim 2 wherein an average of all accumulated cluster indexes is used as a threshold $\beta$ for splitting the object image samples into two groups.

4. A method for training an object classifier hierarchy as in claim 1 wherein object image samples in one of the two groups have a different weight than object image samples in the other of the two groups.

5. A method for training an object classifier hierarchy as in claim 1 wherein object image samples are labeled only as object or non-object, with no additional attribute labeling.

6. A method for training an object classifier hierarchy as in claim 1 wherein the stopping threshold is an error threshold reached on a validation set of training samples.

7. A method for training an object classifier hierarchy as in claim 1 wherein the stopping threshold is a predefined maximum number of iterations.

8. A device for training an object classifier hierarchy from a set of sample images, comprising:
   a processor that:
   iteratively trains an object classifier hierarchy as follows:
   (a) examines object image samples in a feature space to extract feature vectors;
   (b) applies a clustering algorithm to the object image samples in the feature space of selected feature vectors;
   (c) splits the object image samples into two groups using a splitting criterion based on the result of the application of the clustering algorithm;
   (d) assigns one of the two groups of object image samples to train one node of the object classifier hierarchy and assign another of the two groups of object image samples to train another node of the object classifier hierarchy; and
   repeats steps (a)-(d) until a stopping threshold is met
   wherein the splitting criterion is:

$$\frac{f}{T_{FA}} > \delta$$

where f denotes a false alarm rate of a current ensemble classifier, $T_{FA}$ denotes a target false alarm rate, and $\delta \geq 1$ is a threshold controlling a tolerance of non-perfect convergence.

9. A device for training an object classifier hierarchy as in claim 8 wherein the processor accumulates a resulting cluster index of each sample resulting from application of the clustering algorithm using the function:

$$idx = idx + (\eta - \sigma \cdot k)$$

where idx denotes the cluster index label, k denotes the hierarchy level, $\eta$ is the maximum penalty, and $\sigma < 0$ is the penalty ratio on increasing level.

10. A device for training an object classifier hierarchy as in claim 9 wherein an average of all accumulated cluster indexes is used as a threshold $\beta$ for splitting the object image samples into two groups.

11. A device for training an object classifier hierarchy as in claim 8 wherein object image samples in one of the two groups have a different weight than object image samples in the other of the two groups.

12. A device for training an object classifier hierarchy as in claim 8 wherein object image samples are labeled only as object or non-object, with no additional attribute labeling.

13. A device for training an object classifier hierarchy as in claim 8 wherein the stopping threshold is an error threshold reached on a validation set of training samples.

14. A device for training an object classifier hierarchy as in claim 8 wherein the stopping threshold is a predefined maximum number of iterations.

15. One or more tangible, non-transitory computer-readable media embodying instructions executable by a computer to perform a method for training an object classifier hierarchy from a set of sample images, the method comprising:
   inputting a set of object image samples; and
   using a processor to:
   iteratively train an object classifier hierarchy as follows:
   (a) examine the object image samples in a feature space to extract feature vectors;
   (b) apply a clustering algorithm to the object image samples in the feature space of selected feature vectors;
   (c) split the object image samples into two groups using a splitting criterion based on the result of the application of the clustering algorithm;
   (d) assign one of the two groups of object image samples to train one node of the object classifier hierarchy and assign another of the two groups of object image samples to train another node of the object classifier hierarchy; and repeat steps (a)-(d) until a stopping threshold is met; wherein the splitting criterion is:

$$\frac{f}{T_{FA}} > \delta$$

where f denotes a false alarm rate of a current ensemble classifier, $T_{FA}$ denotes a target false alarm rate, and $\delta \geq 1$ is a threshold controlling a tolerance of non-perfect convergence.

16. The one or more tangible, non-transitory computer-readable media as in claim 15 wherein the processor accumulates a resulting cluster index of each sample resulting from application of the clustering algorithm using the function:

$$idx = idx + (\eta - \sigma \cdot k)$$

where idx denotes the cluster index label, k denotes the hierarchy level, $\eta$ is the maximum penalty, and $\sigma < 0$ is the penalty ratio on increasing level.

17. The one or more tangible, non-transitory computer-readable media as in claim 16 wherein an average of all accumulated cluster indexes is used as a threshold $\beta$ for splitting the object image samples into two groups.

* * * * *